United States Patent
Drabczuk

(10) Patent No.: US 7,461,177 B2
(45) Date of Patent: Dec. 2, 2008

(54) DEVICE FUNCTIONALITIES NEGOTIATION, FALLBACK, BACKWARD-COMPATIBILITY, AND REDUCED-CAPABILITIES SIMULATION

(75) Inventor: Nicolas Drabczuk, Fresnes (FR)

(73) Assignee: Axalto S.A (FR)

( * ) Notice: Subject to any disclaimer, the term of this patent is extended or adjusted under 35 U.S.C. 154(b) by 0 days.

(21) Appl. No.: 10/521,084

(22) PCT Filed: Jul. 8, 2003

(86) PCT No.: PCT/IB03/03025

§ 371 (c)(1),
(2), (4) Date: Aug. 16, 2005

(87) PCT Pub. No.: WO2004/008314

PCT Pub. Date: Jan. 22, 2004

(65) Prior Publication Data

US 2006/0101182 A1    May 11, 2006

(30) Foreign Application Priority Data

Jul. 15, 2002    (EP) .................................. 02291778

(51) Int. Cl.
*G06F 3/00* (2006.01)
(52) U.S. Cl. ................................ 710/8; 710/10; 710/15
(58) Field of Classification Search ........................ None
See application file for complete search history.

(56) References Cited

U.S. PATENT DOCUMENTS

| | | | |
|---|---|---|---|
| 6,012,103 A | 1/2000 | Sartore et al. | |
| 6,199,137 B1 | 3/2001 | Aguilar | |
| 6,647,452 B1 * | 11/2003 | Sonoda | 710/305 |
| 6,738,834 B1 * | 5/2004 | Williams et al. | 710/8 |
| 6,754,725 B1 * | 6/2004 | Wright et al. | 710/8 |
| 2001/0027500 A1 | 10/2001 | Matsunaga | |
| 2002/0147912 A1 * | 10/2002 | Shmueli et al. | 713/182 |
| 2002/0178316 A1 * | 11/2002 | Schmisseur et al. | 710/305 |

OTHER PUBLICATIONS

Rivera et al. Transparent Automoding Procedure between a local (Client) Modem and a Remote (Server) Modem, IBM TDB, Aug. 1, 1999, pp. 1-2, total 3 pages w/ including cover.*

J. Howard and S. McGowan: "USB Feature Specification: Dynamic Logical-Device"; Intel Corporation XP002224120, dated Oct. 27, 1999.

International Search Report dated Nov. 5, 2003 (4 pages).

* cited by examiner

*Primary Examiner*—Eron J Sorrell
(74) *Attorney, Agent, or Firm*—Osha•Liang LLP

(57) ABSTRACT

The invention concerns a method of configuring a system. The system comprises a main device and an auxiliary device. The main device and the auxiliary device are arranged to co-operate with each other. The main device is arranged to handle one or more functionalities. The auxiliary device is arranged to effect one or more functionalities. The method is characterized in that the method comprises an adaptation step, in which the auxiliary device is made to hide from the main device at least those of its functionalities that the main device cannot handle.

27 Claims, 3 Drawing Sheets

DEVICE FUNCTIONALITIES NEGOTIATION, FALLBACK, BACKWARD-COMPATIBILITY, AND REDUCED-CAPABILITIES SIMULATION

BACKGROUND OF INVENTION

1. Field of the Invention

The invention relates to a system comprising a first device arranged to communicate with a second device. The first device can be, for example, a USB host. The second device can be, for example, a USB device, which communicates with the USB host via a USB bus using the USB protocol.

2. Background Art

The system comprises a USB host, which is connected to various USB devices via a USB bus. The USB host communicates with the USB devices with the USB protocol. The USB protocol allows connecting several USB devices on the same USB bus using a system of time-sharing based on addressed devices. The USB protocol is organized as a master/slave architecture, the USB host is thus responsible of the time-sharing management.

The USB host may comprise various applications. One or several services may be needed to run an application. An application uses one or several drivers to access and use the associated services. The drivers may be on the USB host.

The USB device may comprise various services, in particular those, which are needed by the applications of the USB host. A service may be offered, for example, at the device level (standard USB device), or at the interface level (composite USB device).

The USB device is organized into several levels a device level, a configuration level, an interface level and an endpoint level. Each level is represented by different USB descriptors:

- A device descriptor describing the overall device. The device descriptor may be associated to one or more configuration descriptors.
- A configuration descriptor describing the electrical characteristics of the USB device, or of a part of the USB device. The configuration descriptor may be associated to one or more interface descriptors.
- An interface descriptor describing a particular service of the USB device. An interface may contain one or more alternate settings. The interface descriptor may be associated to zero or more endpoint descriptors.
- An endpoint descriptor describing a communication channel used by the service defined by the interface descriptor.

In a plugging step, the USB device is plugged onto a USB port of the USB host.

In an enumeration step, all the USB descriptors are then retrieved from the USB device to the host device. The enumeration step is triggered off with the modification of the voltage level on the line D+ or D− (depending on the USB device speed) due to a pull-up resistor present in the USB device on one of the lines.

In a loading step, the USB Host then uses the descriptors to load all the drivers of the USB device. The number of drivers loaded depends on the number of different services present in the USB device. For example, if the USB device is at the same time a scanner and a printer the USB device will have to present two interfaces during the enumeration step. In that case, two drivers, one associated to the scanner interface, and the other one associated to the printer interface, will be loaded. A main driver associated to the device itself could also be loaded.

US 2001/0027500 discloses a data transmission system comprising a host, a controller connected to the host via a plug and play compatible bus, and a plurality of functions provided by the connected controller, that exceed in number the maximum end points that the controller can support, wherein the controller selects a predetermined number of functions from among the plurality of functions and enumerates, as end points, the functions that match in number the maximum end points, and wherein thereafter, the controller replaces with a different function one of the functions that constitutes the end-points, and re-enumerates the endpoints.

SUMMARY OF INVENTION

An object of the invention is to reduce the costs

According to one aspect of the invention, a method of configuring a system comprising a main device and an auxiliary device arranged to co-operate with each other, the main device being arranged to handle one or more functionalities, the auxiliary device being arranged to effect one or more functionalities, characterised in that the method comprises an adaptation step, in which the auxiliary device is made to hide from the main device at least those of its functionalities for which the main device is not arranged to handle.

The first device can be, for example, a USB host. The second device can be, for example, a USB device. The functionalities for which the main device is not arranged to handle will be hidden from the main device. In particular, the invention allows to mass-produce auxiliary devices arranged to effect the same standard set of functionalities. Thus the invention allows a reduction of the costs.

DETAILED DESCRIPTION

Figure 1:
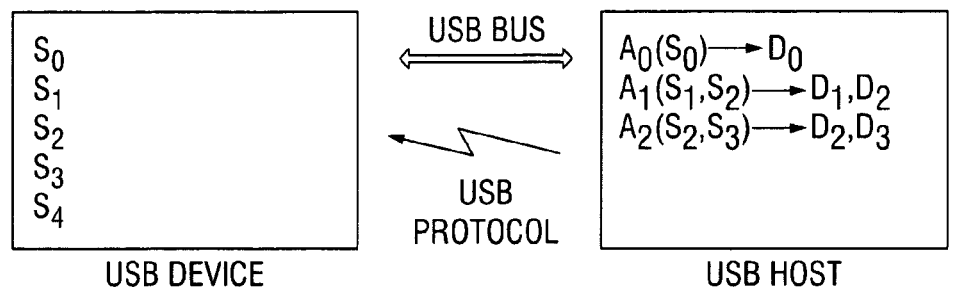
FIG. 1 illustrates a system comprising a USB host and a USB device.

As illustrated in FIG. 1, the invention will be explained in the context of a system using the USB protocol. The system comprises a USB host, which is connected to a USB device via a USB bus. The USB host communicates with the USB devices with the USB protocol.

The communication between the USB host and the USB device can be made according four different transfer modes:
- a control transfer, offering mainly a delivery and data integrity guarantee,
- an interrupt transfer, offering mainly a periodicity and data integrity guarantee,
- a bulk transfer, offering mainly a data integrity guarantee, and a possibly good data rate,
- a isochronous transfer, offering mainly a bandwidth guarantee.

Two of these four modes require a bandwidth reservation, which is accorded or not by the USB host after an enumeration phase, depending on the bandwidth already reserved by other USB devices, which are plugged onto the USB bus.

The USB host comprises various applications (A1, A2). One or several services (S1, S2) are needed to run an application (A1). The application A1 needs, for example, to use the service S1 and the service S2. The services (S1, S2, S3, S4)

are located on the USB device. To use a specific service S1, an application A1 may use a driver D1. The USB host also comprises a standard application (A0) associated with a standard driver (D0). Advantageously the standard application (A0) is implemented on a big number of USB hosts.

Figure 2:
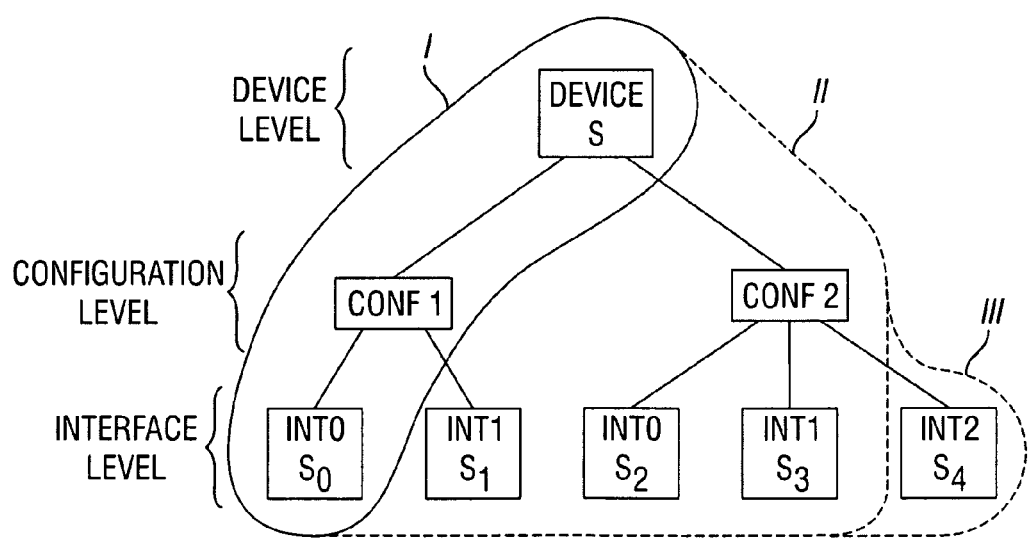
FIG. 2 illustrates the structure of the USB device.

The USB device comprises various services (S1, S2, S3 and S4) in particular those (S1, S2, S3), which are needed by the applications (A1, A2) of the USB host. As illustrated in FIG. 2, a service (S) can be offered, for example, at the device level, or at the interface level (S1,S2,S3,S4). The USB device also comprises a standard service (S0). Advantageously the standard service (S0) is implemented on a big number of USB devices.

Figure 3:
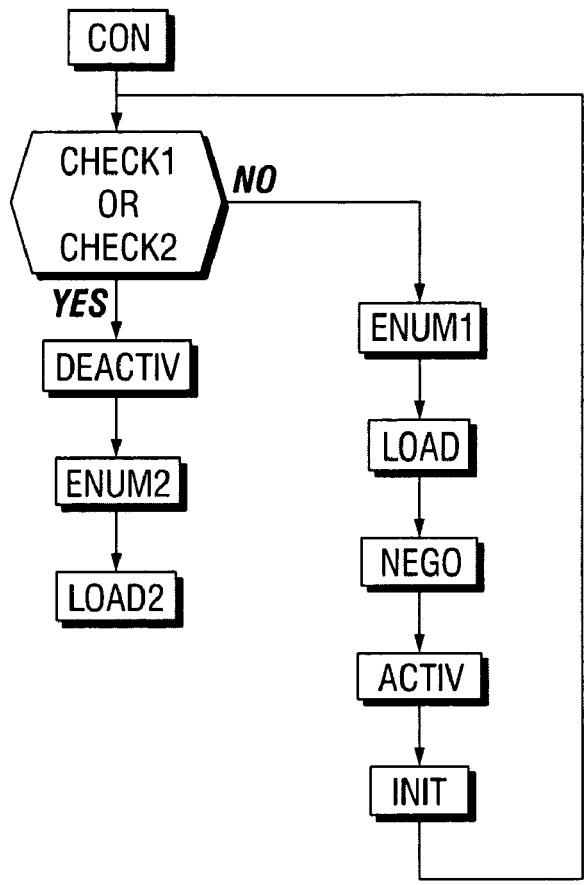
FIG. 3 illustrates a method of using the system.

As illustrated in FIG. 3, in a connecting step CON, the USB device is connected to a USB port of a USB host.

In a first checking step CHECK1, the USB device checks whether a negotiation flag is activated or not.

If not:
  in a first enumerating step ENUM1, the USB host will enumerate the USB device. In other words, as illustrated in FIG. 2, the USB host will retrieve from the USB device to the USB host only the descriptors (I) associated to the standard service S0,
  in a loading step LOAD, the standard driver D0 is loaded into an active memory of the host,
  in a negotiation step NEGO, the standard application A0 negotiates the services (S1, S2, S3) to activate. The negotiating step comprises the following sub-steps:
    a receiving step, in which the standard application A0 receives from the standard service S0 a first list of all the different services (S1, S2, S3, S4) which are available on the USB device,
    a comparing step, in which the standard application compares the first list of all the different services (S1, S2, S3, S4) which are available on the USB device with a second list of the services (S1, S2, S3) needed by the applications (A1,A2) of the USB host to deduce the services to be activated (S1, S2, S3) on the USB device,
    a service activating step, in which the USB device activates the services to be activated (S1, S2, S3).
  In an flag activating step ACTIV, the negotiation flag is activated.
  In an initialization step INIT, the USB device removes its pull-up resistor in order to detach itself and then re-attach itself.
  In a second checking step CHECK2, the USB device checks whether the negotiation flag is activated or not.
  If yes:
    in a deactivating step DEACTIV, the negotiation flag is deactivated,
    in a second enumerating step ENUM2, the USB host enumerates the USB device. As illustrated in FIG. 2, only the descriptors (II) associated to the services (S1, S2, S3) which have been activated and the descriptor associated to the standard service (S0) will be retrieved,
    in a second loading step LOAD2, the standard driver D0 and the drivers associated to the services (S1, S2, S3) which have been activated are loaded into the active memory of the USB host.
  The USB device is now ready for use.

According to an advantage of the invention, if a new service has to be added on the USB device, the standard service (S0) does not change and therefore the standard application (A0) does not change. The invention thus allows a reduction of the cost.

Figure 4:
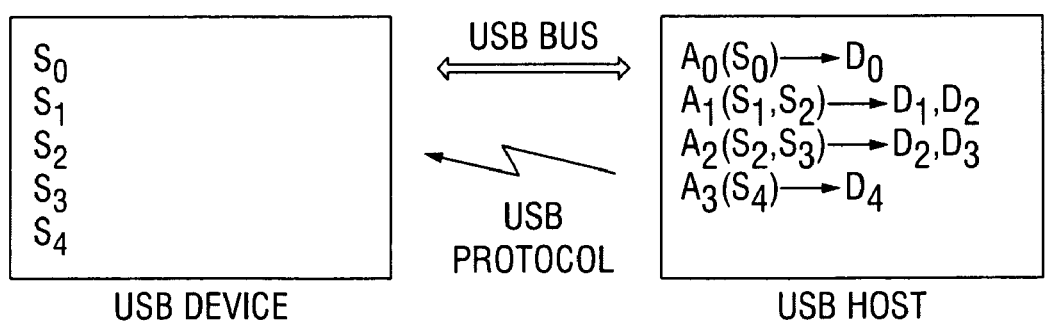
FIG. 4 illustrates a system comprising a USB host and a USB device.
Figure 5:
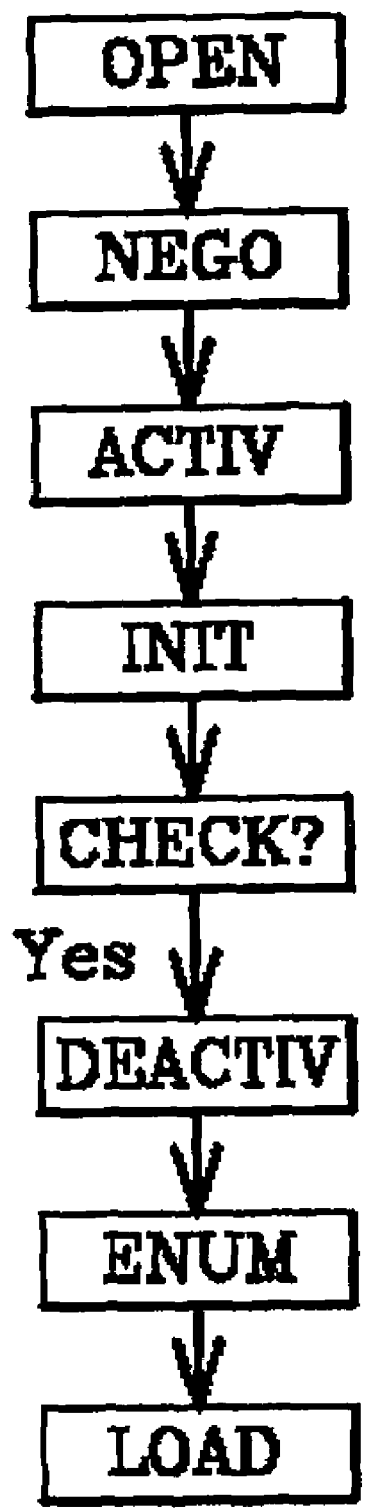
FIG. 5 illustrates a method of using the system.

As illustrated in FIGS. 4 and 5, if the USB device is already plugged, and the user starts a new application (A3), which requires a new service (S4), which is not activated in the USB device, the standard application (A0) can negotiate the activation of the new service (S4) in a new negotiating step.

In an opening step OPEN, user opens a new application (A3) requiring a service (S4), which is not available in the current configuration of the USB device.

In a negotiating step NEG0, the USB host activates the service (S4).

In a flag activating step ACTIV, the USB device activates the negotiation flag.

In an initialization step INIT, the USB device removes its pull-up resistor in order to detach itself and then re-attach In a checking step CHECK, the USB device checks whether the negotiation flag is activated or not.

If yes:
  in a deactivating step DEACTIV, the negotiation flag is deactivated,
  in an enumerating step ENUM, the USB host enumerates the USB device. As illustrated in FIG. 2, only the descriptors (III) associated to the services (S1, S2, S3, S4) which have been activated and the descriptor associated to the standard service (S0) will be retrieved,
  in a loading step LOAD, the standard driver D0 and the drivers associated to the services (S1, S2, S3,S4) which have been activated are loaded into the active memory of the USB host.

The device is ready for use.

The description hereinbefore illustrates the following features:

The invention concerns a method of configuring a system. The system comprises a main device and an auxiliary device. The main device and the auxiliary device are arranged to co-operate with each other. The main device is arranged to handle one or more functionalities. The auxiliary device is arranged to effect one or more functionalities. The method is characterised in that the method comprises an adaptation step, in which the auxiliary device is made to hide from the main device at least those of its functionalities that the main device cannot handle.

The first device can be, for example, a USB host in particular a computer, a Personal Digital Assistant device (PDA) or a mobile phone compliant with the Global System for Mobile communication standard (GSM).

The second device can be, for example, a USB device in particular a smart card or more generally any device that can be personalized, for example, a PDA or GSM.

The USB device can be, for example, a Smart Card comprising three different services:
  Keys and rights management (APDU command transport as defined in the list of Application Protocol Data Unit of the ISO 7816 standard) as service,
  Document signature as service [S1],
  Data streaming application as service [S2] for enabling control of Digital Rights Management (DRM) during the streaming.

The Smart Card can be used in different USB hosts non-exhaustively listed hereafter:
  Corporate Personal Computers running Windows XP as environment [E1],
  Home Personal Computers running Windows XP as environment [E2],
  GSM (also as USB On-The-Go device) as environment [E3],
  PDA (as USB On-The-Go device) as environment [E4].

For all these USB hosts, the services that can be accessed could be:

[S0] and [S1] for [E1], because the user is not administrator of the machine, and can not install a new driver,

[S0], [S1] and [S2] for [E2], because the user is administrator of the machine and can install any service available,

[S0] only for [E3], for memory or consumption economy reasons,

[S0] only for [E4], because the host cannot be personalized and only the driver for [S0] is available.

The services located on the USB device are not necessarily related to the USB device itself. The services can be vendor specific or not. For example; a smartcard (USB device) may have a modem service, so that the smartcard can be seen as a distant terminal through a modem connection.

It should be clear that the invention is not limited to devices communicating using the USB protocol. Other protocols like, for example, firewire based protocol may be used.

It should be clear that the invention is not limited to devices communicating according to a master/slave protocol.

In the comparing step, the first list of services and the second list of services have been used to deduce the services to be activated on the USB device. More generally any other set of data defining the services can be used to deduce the services to be activated. It can be, for example, a set of data identifying various services and giving the bandwidth needed by these services.

In the USB context, new USB Device Classes can be defined. All the USB hosts must contain default drivers for the defined classes. When a USB Device Class is modified because, for example, some new functionality is added, it is difficult to update all the USB hosts. The above-described invention allows adding some functionality to a device without having to modify the Device Class, and so, without modifying the standard drivers of the USB host.

What is claimed is:

1. A method of configuring a system comprising:
a main device and an auxiliary device arranged to cooperate with each other, the main device being arranged to handle one or more functionalities, the auxiliary device being arranged to effect one or more functionalities;
wherein the method comprises an adaptation step, in which the auxiliary device performs a first enumeration of its functionalities to the main device;
wherein the method further comprises an enumeration step in which the auxiliary device performs a second enumeration of its functionalities to the main device;
wherein the main device enumerates to the auxiliary device the functionalities of the auxiliary device for which the main device is arranged to handle after the first enumeration and prior to the second enumeration; and
wherein the second enumeration hides from the main device at least those of its functionalities for which the main device is not arranged to handle.

2. The method according to claim 1, wherein the adaptation step comprises the following sub-steps:
a notification step, in which the auxiliary device notifies the main device of a set of data corresponding to the first enumeration of the functionalities that the auxiliary device can effect;
an identification step, in which the set of data is used to identify the functionalities that the auxiliary device can effect but that the main device cannot handle; and
a configuration step, in which the auxiliary device is configured to hide for the second enumeration from the main device at least those of its functionalities that the main device cannot handle.

3. The method according to claim 2, wherein the adaptation step is followed by an enumeration step, in which the auxiliary device presents itself to the main device without the functionalities identified in the identification step.

4. The method according to claim 3, wherein a simulation step is carried out between the adaptation step and the enumeration step, in which the disconnecting and the reconnecting of the auxiliary device is simulated.

5. The method according to claim 1, wherein the adaptation step is carried out automatically when connecting the auxiliary device to the main device.

6. The method according to claim 1, wherein the main device is a USB host and the auxiliary device is a USB device.

7. The method according to claim 1, wherein the auxiliary device is a smartcard.

8. The method according to claim 1, wherein the functionalities are services available on the auxiliary device.

9. The method according to claim 8, wherein at least one of the services is required to run an application on the main device.

10. A system comprising:
a main device and an auxiliary device arranged to cooperate with each other, the main device being arranged to handle one or more functionalities, the auxiliary device being arranged to effect one or more functionalities;
wherein the auxiliary device performs a first enumeration of its functionalities and a second enumeration of its functionalities to the main device;
wherein the main device comprises an enumerating means for enumerating to the auxiliary device the functionalities of the auxiliary device for which the main device is arranged to handle after the first enumeration and prior to the second enumeration; and
wherein the second enumeration hides those of its functionalities for which the main device is not arranged to handle.

11. The system according to claim 10, wherein the functionalities are services available on the auxiliary device.

12. The system according to claim 11, wherein at least one of the services is required to run an application on the main device.

13. An auxiliary device comprising:
a computer readable storage medium, comprising instructions, that when executed cause:
a plurality of functionalities to cooperate with a main device, wherein the main device comprises a computer readable storage medium, comprising instructions, that when executed cause: arranging the main device to handle one or more functionalities,
the auxiliary device to effect at least one of the plurality of functionalities,
the auxiliary device to perform a first enumeration of at least one of the plurality of functionalities and a second enumeration of at least one of the plurality of functionalities to the main device;
wherein the second enumeration is performed after the first enumeration and after the main device has enumerated to said auxiliary device the functionalities of the auxiliary device for which the main device is arranged to handle or for which the main device is not arranged to handle; and wherein the second enumeration hides of its functionalities for which the main device is not arranged to handle.

14. The auxiliary device according to claim 13, wherein each of the plurality of functionalities corresponds to a service available on the auxiliary device.

15. The auxiliary device according to claim 14, wherein at least one of the plurality of functionalities is required to run an application on the main device.

16. A computer readable storage medium, comprising instructions, that when executed cause the performance a method, the method comprising:

a main device and an auxiliary device arranged to cooperate with each other, the main device being arranged to handle one or more functionalities, the auxiliary device being arranged to effect one or more functionalities;

wherein the method comprises an adaptation step, in which the auxiliary device performs a first enumeration of its functionalities;

wherein the method further comprises an enumeration step in which the auxiliary device performs a second enumeration of its functionalities to the main device;

wherein the main device enumerates to the auxiliary device the functionalities of the auxiliary device for which the main device is arranged to handle after the first enumeration and prior to the second enumeration; and wherein the second enumeration hides those of its functionalities for which the main device is not arranged to handle.

17. The computer readable medium according to claim 16, wherein the functionalities are services available on the auxiliary device.

18. The computer readable medium according to claim 17, wherein at least one of the services is required to run an application on the main device.

19. A method of configuring a system comprising:

a main device and an auxiliary device arranged to cooperate with each other, the main device being arranged to handle one or more functionalities, the auxiliary device being arranged to effect one or more functionalities;

wherein the method comprises an adaptation step, in which the auxiliary device performs a first enumeration of its functionalities to the main device;

wherein the method further comprises an enumeration step in which the auxiliary device performs a second enumeration of its functionalities to the main device; and wherein the main device enumerates to the auxiliary device the functionalities of the auxiliary device for which the main device is not arranged to handle after the first enumeration and prior to the second enumeration; and wherein the second enumeration hides from the main device at least those of its functionalities for which the main device is not arranged to handle.

20. The method according to claim 19, wherein the adaptation step comprises the following sub-steps:

a notification step, in which the auxiliary device notifies the main device of a set of data corresponding to the first enumeration of the functionalities that the auxiliary device can effect;

an identification step, in which the set of data is used to identify the functionalities that the auxiliary device can effect but that the main device cannot handle; and a configuration step, in which the auxiliary device is configured to hide for the second enumeration from the main device at least those of its functionalities that the main device cannot handle.

21. The method according to claim 20, wherein the adaptation step is followed by the enumeration step, in which the auxiliary device presents itself to the main device without the functionalities identified in the identification step.

22. The method according to claim 21, wherein a simulation step is carried out between the adaptation step and the enumeration step, in which the disconnecting and the reconnecting of the auxiliary device is simulated.

23. The method according to claim 19, wherein the adaptation step is carried out automatically when the connecting the auxiliary device to the main device.

24. The method according to claim 19, wherein the main device is a USB host and the auxiliary device is a USB device.

25. The method according to claim 19, wherein the auxiliary device is a smartcard.

26. A system comprising:

a main device and an auxiliary device arranged to cooperate with each other, the main device being arranged to handle one or more functionalities, the auxiliary device being arranged to effect one or more functionalities;

wherein the auxiliary device performs a first enumeration of its functionalities and a second enumeration of its functionalities to the main device;

wherein the main device comprises an enumerating means for enumerating to the auxiliary device the functionalities of the auxiliary device for which the main device is not arranged to handle after the first enumeration and prior to the second enumeration; and wherein the second enumeration hides those of its functionalities for which the main device is not arranged to handle.

27. A computer readable storage medium, comprising instructions, that when executed cause the performance of a method, the method comprising:

a main device and an auxiliary device arranged to cooperate with each other, the main device being arranged to handle one or more functionalities, the auxiliary device being arranged to effect one or more functionalities;

wherein the method comprises an adaptation step, in which the auxiliary device performs a first enumeration of its functionalities;

wherein the method further comprises an enumeration step in which the auxiliary device performs a second enumeration of its functionalities to the main device; and wherein the main device enumerates to the auxiliary device the functionalities of the auxiliary device for which the main device is not arranged to handle after the first enumeration and prior to the second enumeration and;

wherein the second numeration hides those of its functionalities for which the main device is not arranged to handle.

* * * * *